(12) United States Patent
Ifield et al.

(10) Patent No.: US 9,303,814 B2
(45) Date of Patent: Apr. 5, 2016

(54) SYSTEM FOR AUTOMATIC LUBRICATION

(75) Inventors: Benjamin Ifield, New South Wales (AU); Robert William Ifield, New South Wales (AU); Craig Alan Ifield, New South Wales (AU)

(73) Assignee: BOB IFIELD HOLDINGS PTY LTD, New South Wales (AU)

(*) Notice: Subject to any disclaimer, the term of this patent is extended or adjusted under 35 U.S.C. 154(b) by 384 days.

(21) Appl. No.: 13/392,186

(22) PCT Filed: Aug. 27, 2010

(86) PCT No.: PCT/AU2010/001104
§ 371 (c)(1), (2), (4) Date: Feb. 24, 2012

(87) PCT Pub. No.: WO2011/022777
PCT Pub. Date: Mar. 3, 2011

(65) Prior Publication Data
US 2012/0145482 A1    Jun. 14, 2012

(30) Foreign Application Priority Data

| Aug. 28, 2009 | (AU) | 2009904102 |
| Mar. 1, 2010 | (AU) | 2010900857 |
| Mar. 25, 2010 | (AU) | 2010901322 |

(51) Int. Cl.
*F16N 7/38* (2006.01)
*F16N 27/00* (2006.01)

(52) U.S. Cl.
CPC ............ *F16N 27/00* (2013.01); *F16N 7/385* (2013.01); *F16N 2210/14* (2013.01); *Y10T 137/0318* (2015.04); *Y10T 137/85978* (2015.04)

(58) Field of Classification Search
CPC ........... F16N 13/16; F16N 7/38; F16N 7/385; F16N 27/00
USPC ....................... 184/6; 137/565.01, 1
See application file for complete search history.

(56) References Cited

U.S. PATENT DOCUMENTS 3,145,803 A * 8/1964 Cobert ............................ 184/7.4
3,995,717 A * 12/1976 Kroffke ........................ 184/7.4
(Continued)

FOREIGN PATENT DOCUMENTS

DE    10318671 A1    11/2004
JP    2006336770 A    12/2006
(Continued)

*Primary Examiner* — Michael Mansen
*Assistant Examiner* — Michael Riegelman
(74) *Attorney, Agent, or Firm* — AKC Patents, LLC; Aliki K. Collins

(57) ABSTRACT

A system for automatically delivering lubricant to at least one bearing (16) has a lubricant pump (1) feeding lubricant under pressure through a supply line (3) to an injector (4). The injector, driven by the lubricant, sends a measured amount of lubricant down feed line (14) to bearing (16). A pressurizing valve (15) maintains injection pressure in the feed line (14) enabling any failure of supply to be detected as a pressure drop at pressure switch (2). Preferred features include the incorporation of a second pressurizing valve (12) at the injector end of the feed line (14), a blocked-line vent valve (13) to enable detection of a blocked or crushed feed line, and check valves (10) and (11). The injector (4) is preferably configured to produce a higher pressure at the outlet than the inlet, and various versions of this intensifying injector are described and claimed.

10 Claims, 13 Drawing Sheets

(56) References Cited

U.S. PATENT DOCUMENTS

| | | | |
|---|---|---|---|
| 4,520,902 A | 6/1985 | Snow | |
| 4,530,373 A | 7/1985 | Bork, Jr. et al. | |
| 4,784,578 A | 11/1988 | Gruett | |
| 4,821,799 A * | 4/1989 | Wong | 166/84.2 |
| 5,285,871 A * | 2/1994 | Sievenpiper | 184/7.4 |
| 5,482,138 A * | 1/1996 | Mori et al. | 184/6.4 |
| 6,286,627 B1 * | 9/2001 | Grach et al. | 184/6 |
| 6,405,810 B1 * | 6/2002 | Grach et al. | 175/52 |
| 6,557,651 B1 * | 5/2003 | Norby et al. | 175/52 |
| 6,688,434 B2 * | 2/2004 | Johnson et al. | 184/15.3 |
| 7,163,086 B2 * | 1/2007 | Care et al. | 184/6.11 |
| 7,694,748 B2 * | 4/2010 | Oksman | 173/77 |
| 2006/0162944 A1 | 7/2006 | Kirsch | |
| 2009/0057063 A1 | 3/2009 | Marek | |
| 2009/0071754 A1 * | 3/2009 | McArthur | 184/7.4 |
| 2009/0127028 A1 | 5/2009 | He | |
| 2010/0219020 A1 * | 9/2010 | Knox | 184/7.4 |
| 2013/0248294 A1 * | 9/2013 | Kettunen et al. | 184/26 |

FOREIGN PATENT DOCUMENTS

| | | |
|---|---|---|
| SU | 1023117 A | 6/1983 |
| WO | WO0163132 A2 | 8/2001 |

\* cited by examiner

Full Size

SYSTEM FOR AUTOMATIC LUBRICATION

FIELD OF THE INVENTION

This invention relates to a system and apparatus for automatic lubrication of the bearings used on mechanical equipment, replacing manual greasing to improve reliability and reduce operational costs, and has been devised particularly though not solely for use on machinery operating in arduous conditions such as used in mining or earth moving.

BACKGROUND OF THE INVENTION

Automatic lubrication systems are used on many types of machinery, from large fixed plant to smaller mobile construction and mining equipment. In general they replace previous procedures requiring manual application using grease guns and the like. There is a wide range of equipment available in the market, performing a useful service in improving machine reliability, reducing the hazards of manual access to the machine, reducing the time requirement for maintenance and minimising the quantity of lubricant required.

A typical automatic lubrication system includes a pumping system that receives grease from a reservoir and periodically delivers the grease through supply lines to a number of injectors, which, in turn, deliver prescribed amounts of grease through a feed line to each lubrication point. In the interests of clarity, the conduit between the pump and the injector, usually constructed from a combination of elements including pipes, tubes, hoses and drillings, is called the "supply line", and similarly, the conduit between the injector and the bearing is called the "feed line". The generic term "supply conduit" used in the claims of this specification is synonymous with "supply line" as defined above, and similarly the generic term "feed conduit" is synonymous with "feed line".

The number of injectors varies with the requirement of the equipment, as they are individually connected to a bearing or other mechanism requiring lubrication. This permits the variable requirements of each point to be satisfied.

The injectors incorporate means for individually adjusting the amount of grease dispensed with each shot, and typically provide a visual means of inspecting that they are functioning. For this reason they are usually mounted in a position convenient for maintenance and inspection. On the other hand, the feed line from the injector has to be routed to its appropriate bearing, which will sometimes be situated in normally inaccessible parts of the machine.

There are many types of pumping systems, powered by electric motors, compressed air, hydraulic pressure from the machine's hydraulic system, or even manually. The frequency of operation is often controlled by an electrical timer, or computer performing the same function, or can be linked to the operation duty of the machine. Typically, each operation consists of pumping grease from a reservoir to a fixed pressure, holding the pressure for at least long enough for the pressure to reach all the injectors against the viscous drag of the grease in the supply lines, and then venting this pressure back to the grease reservoir to allow the injectors to reset.

There are three main types of injector systems in common use. The simplest of these is the single line system, where the pump periodically pressurises the injectors, causing them to inject their adjusted amount of grease down the feed line to the bearing, then vents the pressure so that the injectors can reset ready for the next shot. This system can have disadvantage with longer supply lines between the pump and injectors in that the viscosity of the grease can lead to slow venting times so that the maximum frequency of grease application has to be reduced to ensure that the injectors reset. Injector designs that have a higher reset pressure are then superior in these conditions.

A second type is the dual line system, which overcomes the reset time problem by running two lines to each injector and reversing the pressure between the lines. The injectors are then designed to have a bidirectional capability so that each reversal of pressure causes the injector to discharge its prescribed amount of grease to a feed line. The full pump pressure is then used to overcome the effects of grease viscosity.

The third type is the progressive system, where banks of injectors automatically cycle as long as pressure is applied, and do not require any form of resetting. Lower cost versions of this system do not provide individual adjustment of each output. They are sensitive to particulate contamination, and a stoppage of one output also causes all the others in the same bank to stop as well.

In summary, the single line system offers many advantages over other systems, but needs a high reset pressure to be usable with long supply lines.

Operation of a lubrication system is only useful when it is functioning correctly. If it is the case that the operator can use the machine and continue to operate unknowingly with a faulty system then there is the possibility that the automatic system is less certain than using a manual grease gun for each point. It would then be an important improvement if the system verifies that grease is reaching the bearing and alerts the operator if there is a problem.

The most vulnerable part of the system in many machines is the feed line from the injector to the bearing, as this is often not easily accessible, adjacent to moving parts, and subject to misadventure, such as rocks falling out of a loader bucket. There are some systems that apply sensors to the lubrication point using wires within the feed lines connecting back to a monitoring computer, but these are expensive and complex, and the majority of installations trust to luck and frequent inspections, and accept the occasional bearing failure caused by a lubrication system shortcoming as a reality of operation.

In the interests of brevity, this application refers to the lubricant as grease, being the most common substance, but other lubricants, such as oil, and synthetic liquids, or gels, can be used with the invention. Similarly, where components such as pistons are referred to as having a diameter, it will be obvious that in at least some cases the same functionality can be achieved with other cross-sections such as oval or square. Similarly again for brevity, the lubrication system is described as delivering lubricant to bearings, with this being used as a generic term to describe any structure receiving an injected fluid at one or more lubrication points.

It should also be recognised that although the invention has been devised for the lubrication of bearings, in its broadest aspects it could be used for the precise and reliable delivery of predetermined qualities of any liquid to an end point. Such applications might include, although not be limited to; dispensing of disinfectants or anti-bacterial agents into cooling towers; medical applications; or automatic adhesive applications. The description of the delivery of lubricant to bearings throughout this specification should be regarded as a specific example of delivery of a generic liquid to any end point.

Using common fluid power terminology throughout this specification; a check valve is a one-way valve that permits free flow in one direction, but is closed to flow in the reverse direction; a "pressurising valve" allows flow at least in one direction while imposing a set pressure rise substantially independent of the flow rate, often, but not always, also acting to prevent flow in the reverse direction; a "relief valve" is a pressurising valve that is sensitive to the downstream pressure so that the upstream pressure is the sum of the set pressure and the downstream pressure; and, a "sequence valve" is not sensitive to downstream pressure so that the upstream pressure is constant regardless of the downstream pressure, at least until downstream pressure exceeds the pressure setting of the valve.

SUMMARY OF THE INVENTION

In a first aspect this invention provides a system for automatically delivering lubricant to at least one bearing, the system including a lubricant pump, a sliding piston injector adapted to be driven by lubricant supplied under pressure from the pump, a supply conduit connecting an inlet on the injector to the pump, a feed conduit connecting an outlet on the injector to the bearing, and at least a first pressurising valve located in the feed conduit, arranged to maintain injection pressure in the feed conduit in normal operation of the system.

Preferably, wherein the first pressurising valve is located at the bearing end of the feed conduit.

Preferably, wherein a second pressurising valve is provided, located at the injector end of the feed conduit.

Preferably, wherein the additive pressure settings of the two pressurising valves exceeds the pressure in the supply conduit developed by the pump.

Preferably, one or both of the pressurising valves are sequence valves.

Preferably, the injector is arranged to produce a pressure at the outlet higher than the pressure at the inlet.

Preferably, the system includes a one-way valve at the injector end of the feed conduit arranged to prevent lubricant returning to the injector when the pump is inactive.

Preferably, the system includes venting means in the feed conduit arranged to vent the feed conduit pressure in the event of momentary excessive pressure.

Preferably, the system includes a pressure sensor means reactive to supply line pressure and interacting with logic evaluation means to evaluate the pressure achieved during each operating cycle of the injector.

Preferably, the pressure sensor is a pressure switch.

Preferably, the injector includes the second pressurising valve configured as a check valve connecting the inlet to the outlet.

Alternatively, the second pressurising valve is a check valve connecting the supply line to the feed line.

In a second aspect this invention provides a method for providing an alarm in the event of a feed line rupture in an automatic lubrication system comprising a reservoir, a pump, an injector and connecting conduits, the pump arranged to operate with adjustable periodicity to deliver lubricant from the reservoir through a supply line to the injector, the injector arranged to respond to the periodic pressure in the supply line to deliver a preset quantity of lubricant through a feed line to a bearing, including a bypass valve connecting between the supply and feed lines and a pressurising valve at the bearing end of the feed line, said method comprising the steps of sensing the supply pressure at the end of a periodic injection cycle, comparing with a normal value, and activating an alarm if the supply pressure is low at this point of the cycle.

In a third aspect this invention provides a method for providing an alarm in the event of a feed line blockage in an automatic lubrication system comprising a reservoir, a pump, an injector and connecting conduits, the pump arranged to operate with adjustable periodicity to deliver lubricant from the reservoir through a supply line to the injector, the injector arranged to respond to the periodic pressure in the supply line to deliver a preset quantity of lubricant through a feed line to a bearing, including a bypass valve connecting between the supply and feed lines, a pressurising valve at the bearing end of the feed line, and venting means in the feed line to vent the feed line pressure in response to a momentary excessive pressure, said method comprising the steps of sensing the supply pressure at the end of a periodic injection cycle, comparing with a normal value, and activating an alarm if the supply pressure is low at this point of the cycle.

In a further aspect, the invention provides an injector for use in an automatic lubrication system comprising a reservoir, a pump, the injector and connecting conduits, the pump arranged to operate with adjustable periodicity to deliver lubricant from the reservoir through a supply line to the injector, the injector comprising a body, with an inlet connected to the supply line and an outlet connected to a feed line, and enclosing an axially sliding piston urged to move within the body under the action of lubricant pressure at the inlet to deliver a preset quantity of lubricant through the outlet to the feed line and thence, in use, to a bearing, wherein the piston is arranged to have an outer smaller diameter and an inner larger diameter at a first end, both in sealing engagement with the body, defining an annular working first working area smaller than a second working area defined by the larger diameter, the piston being, at rest, urged inward in the body by spring force, this force overcome by supply pressure delivered through the inlet acting on the second working area to move the piston outwards to eject lubricant from a discharge volume defined by the first working area.

Preferably part of the piston extends beyond the body, providing for visual inspection of the position of the piston.

Preferably an adjustable stop acts on the extended part of the piston to limit movement, thereby providing adjustment of the quantity of lubricant ejected from the discharge volume.

Preferably the adjustable stop is a screw-threaded member.

Preferably a delivery check valve is placed between the discharge volume and the outlet, permitting flow from the discharge volume to the outlet, but not from the outlet to the discharge volume.

Preferably the delivery check valve is formed by an elastomeric ring engaged in a groove with incoming ports in the base of the groove, the ports held normally closed by the resilience of the elastomeric ring, further urged closed when outlet pressure is higher than that in the discharge chamber.

Preferably a bypass check valve connects the inlet to the outlet, permitting flow from inlet to outlet but not from outlet to inlet.

Preferably the bypass check valve is formed by a lip on an elastomeric seal acting on the larger diameter.

Preferably the bypass check valve connects the inlet to the side of the delivery check valve connected to the discharge volume.

Preferably a delivery pressurising valve is connected in the outlet, to maintain an intermediate pressure in the supply line should the feed line lose pressure, with the bypass check valve connecting the inlet to the outlet.

Preferably the delivery pressurising valve is a sequence valve.

Alternatively the delivery pressurising valve can replace the delivery check valve, providing both functions.

Preferably the injector includes a blocked-line vent valve to vent the feed line pressure in the event of momentary excessive pressure.

Preferably the blocked-line vent valve is a burst disc.

In a still further aspect, the invention provides a valve for use as a delivery pressurising valve in an automatic lubrication system, the valve comprising a body, a valve poppet, a spring and a seal, the valve poppet arranged to move axially within the body with a first valve seat formed at a first end of the valve poppet, a second valve seat formed within the body, the spring urging the first valve seat against the second valve seat so that the pressure setting of the valve is a function of the force of the spring and the area enclosed by the seat diameter, formed by the contact of the first and second valve seats, wherein the seal acts on a diameter with area substantially equal to the area of the seat diameter, the second end of the valve poppet being open to atmospheric pressure.

Preferably the second end of the valve poppet extends through the centre of the spring to make sealing engagement with the body. Alternatively the seal is positioned in the valve poppet adjacent to the first seat with an effective diameter slightly larger than that of the seat.

In yet a further aspect, the invention provides a valve for use of as an end-of-line valve in an automatic lubrication system, the valve comprising a body, a valve poppet, a spring and a seal, the body comprising an inlet port adapted to connect to the feed line in use and an outlet port adapted to mount on a bearing in use, the valve poppet arranged to move axially within the body with a first valve seat formed at a first end of the valve poppet, a second valve seat formed within the body, the spring urging the first valve seat against the second valve seat so that the pressure setting of the valve is a function of the force of the spring and the area enclosed by the seat diameter, formed by the contact of the first and second valve seats, wherein the seal acts on a diameter with area substantially equal to the area of the seat diameter, the second end of the valve poppet being open to atmospheric pressure.

Preferably the second end of the valve poppet extends through the centre of the spring to make sealing engagement with the body.

Preferably the body is weaker in the vicinity of the inlet port than in the vicinity of the outlet port so that a snagged feed line will preferentially break the valve at the inlet port, causing the feed line to be vented.

In a further aspect, the invention provides a valve for use as a blocked-line vent valve in an automatic lubrication system, the valve comprising a body, a valve poppet and a spring, the body comprising an inlet port adapted to connect to the feed line in use and an outlet port open to atmosphere in use, the valve poppet arranged to move axially within the body with a first valve seat formed at a first end of the valve poppet, a second valve seat formed within the body, the spring urging the first valve seat against the second valve seat so that the pressure setting of the valve is a function of the force of the spring and the area enclosed by a seat diameter, formed by the contact of the first and second valve seats, wherein an outer diameter of the poppet is many times larger than that of the seat diameter and engages with sliding contact with the body, providing a partial seal, arranged that discharge of lubricant past the seat diameter will then act on the outer diameter, reducing the pressure setting of the valve.

Preferably the valve includes a bleed passage connecting the gallery between the first valve seat and the outer diameter to atmosphere, to allow the valve to reseat after a preset period of time in the absence of lubricant flow.

Preferably the bleed passage consists of a hole through the poppet. Alternatively the bleed passage can consist of a controlled clearance between the outer diameter and the body.

In yet a further aspect, the invention provides an injector for use in an automatic lubrication system comprising a reservoir, a pump, the injector and connecting conduits, the pump arranged to operate with adjustable periodicity to deliver lubricant from the reservoir through a supply line to the injector, the injector comprising a body, with an inlet connected to the supply line and an outlet connected to a feed line, and enclosing an axially sliding piston assembly urged to move within the body under the action of lubricant pressure at the inlet to deliver a preset quantity of lubricant through the outlet to the feed line and thence, in use, to a bearing, wherein the piston assembly is arranged to have an outer smaller diameter and an inner larger diameter at a first end, both in sealing engagement with the body, defining an annular working first working area smaller than a second working area defined by the larger diameter, the piston being, at rest, urged inward in the body by spring force, this force overcome by supply pressure delivered through the inlet acting on the second working area to move the piston outwards to eject lubricant from a discharge volume defined by the first working area.

Preferably, the piston assembly comprises a piston with part of its length arranged to be a piston rod and a piston seal, with the piston seal providing the larger diameter and the piston rod providing the smaller diameter.

Preferably, part of the piston extends beyond the body, providing for visual inspection of the position of the piston.

Preferably, a delivery check valve is formed by an elastomeric ring engaged in a groove with incoming ports in the base of the groove, the ports held normally closed by the resilience of the elastomeric ring, further urged closed when outlet pressure is higher than inlet pressure.

Preferably, the piston seal is arranged to have a flexible lip configured to permit free flow of lubricant from the inlet to the outlet, but acts to prevent flow in the reverse direction.

Preferably, the setting of the delivery volume from the injector is set by adjustment of the initial position of the piston.

Preferably, the adjustment of the initial position is achieved by rotation of the piston interacting by threaded means with a spring sleeve.

Preferably, inadvertent rotation of the piston during use is prevented by friction means between the piston and the spring sleeve.

Preferably, the friction means comprises at least one elastomeric ring compressively engaging with surfaces on both the piston and the spring sleeve.

In it's very broadest aspect the invention provides a system for automatically delivering predetermined qualities of a liquid to an end point, the system including a liquid pump, a sliding piston injector adapted to be driven by liquid supplied under pressure from the pump, a supply conduit connecting an inlet on the injector to the pump, a feed conduit connecting an outlet on the injector to the end point, and at least a first pressurising valve located in the feed conduit, arranged to maintain injection pressure in the feed conduit in normal operation of the system.

Preferably the first pressurising valve is located adjacent the end point.

Preferably a second pressurising valve is provided, located at the injector end of the feed conduit.

BRIEF DESCRIPTION OF THE DRAWINGS

Notwithstanding any other forms that may fall within its scope, one preferred embodiment of the invention and variations thereof will now be described with reference to the accompanying drawings in which.

DETAILED DESCRIPTION OF THE PREFERRED EMBODIMENT OF THE INVENTION AND VARIATIONS THEREOF

This section describes a preferred embodiment of the complete implementation of the invention as a lubrication system. Some performance benefit can be gained by use of some of the components of the invention, as is discussed in later sections.

Figure 1:
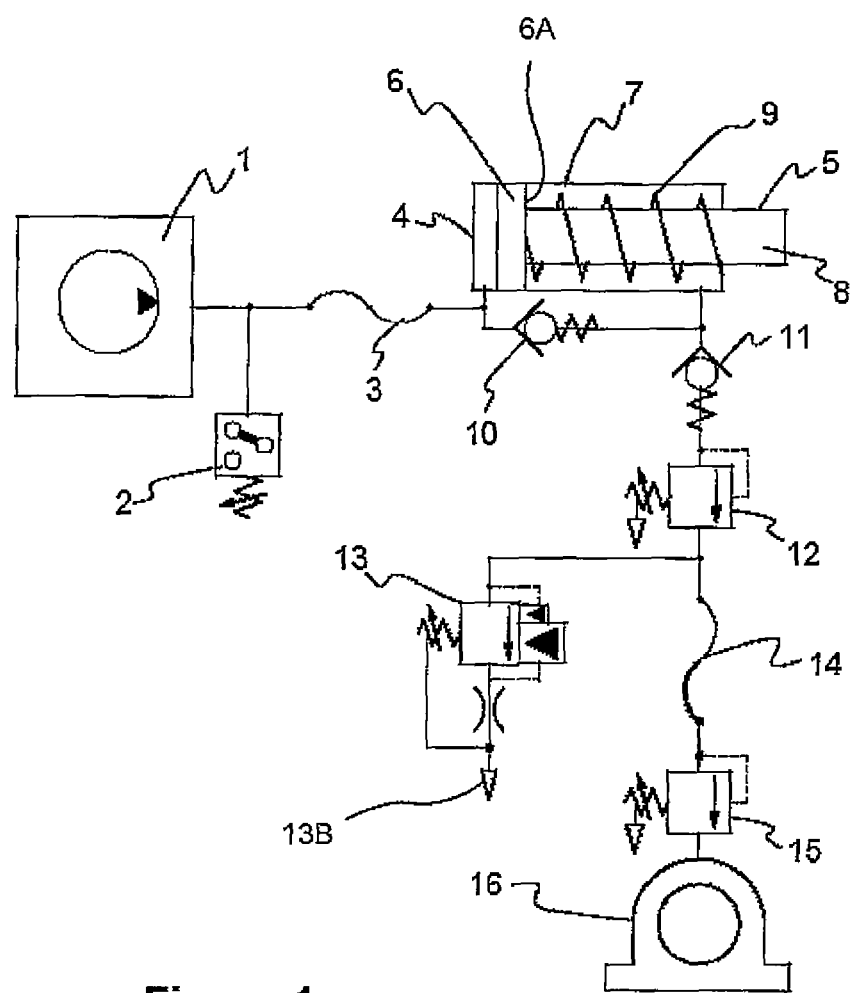
FIG. 1 is a diagrammatic representation of the preferred embodiment of the invention.

FIG. 1 shows a schematic diagram of the system. 1 is a conventional grease pump assemblage as suitable for a single line lubrication system, consisting of known means to periodically supply grease under pressure for a set period and then vent the pressure back to its reservoir. A pressure sensor 2 is provided, typically a simple pressure switch, that is set to operate at a pressure slightly lower than the maximum pressure of the grease pump, so that it normally activates for a period of time in each lubrication cycle.

Connecting line 3 indicates that there can be a significant length of supply line between the pump and intensifying injector 4. Only one injector is shown in FIG. 1 but an automatic lubrication system will normally have many injectors supplied by the single grease pump, as is well known.

The injector consists of a piston 5 which has at least two different diameter portions; a larger diameter portion 6 which slides with sealing contact within the bore of the encapsulating body 7, and a small diameter portion 8 which slides with sealing contact with an aperture in the body. These portions form three areas that define the functionality of the injector; A1 being the area of the large diameter portion 6; A3 being the cross-sectional area of the small diameter portion 8; and A2 being the difference between A1 and A3, typically presented by the annulus area 6A of portion 6 exposed around the periphery of portion 8. The piston is urged inwardly by a compression spring 9.

A bypass valve 10 is a functional component of the injector and allows supply pressure acting on the large diameter portion 6 of the piston to freely communicate to the annulus area 6A, but closes to prevent flow in the reverse direction. This is shown diagrammatically as a check valve, being the preferred construction, but may be any valve that both allows connection from the inlet to the outlet of the injector when a defined outlet pressure is not achieved and prevents flow in the reverse direction.

An intensification ratio (R) is defined by the ratio of A1 and A2. This value can be varied in the injector design to suit the particulars of a machine to which the lubrication system is to be applied, and typically has a value between 2 and 4. The extension of the small diameter portion 8 out of the body is used to provide a visual indication of the operation of the injector, and an adjustment screw can be applied, not shown, to adjustably limit the stroke of the piston. The injector volumetric output is the multiple of the annular area A2 and the piston stroke.

Figure 2:
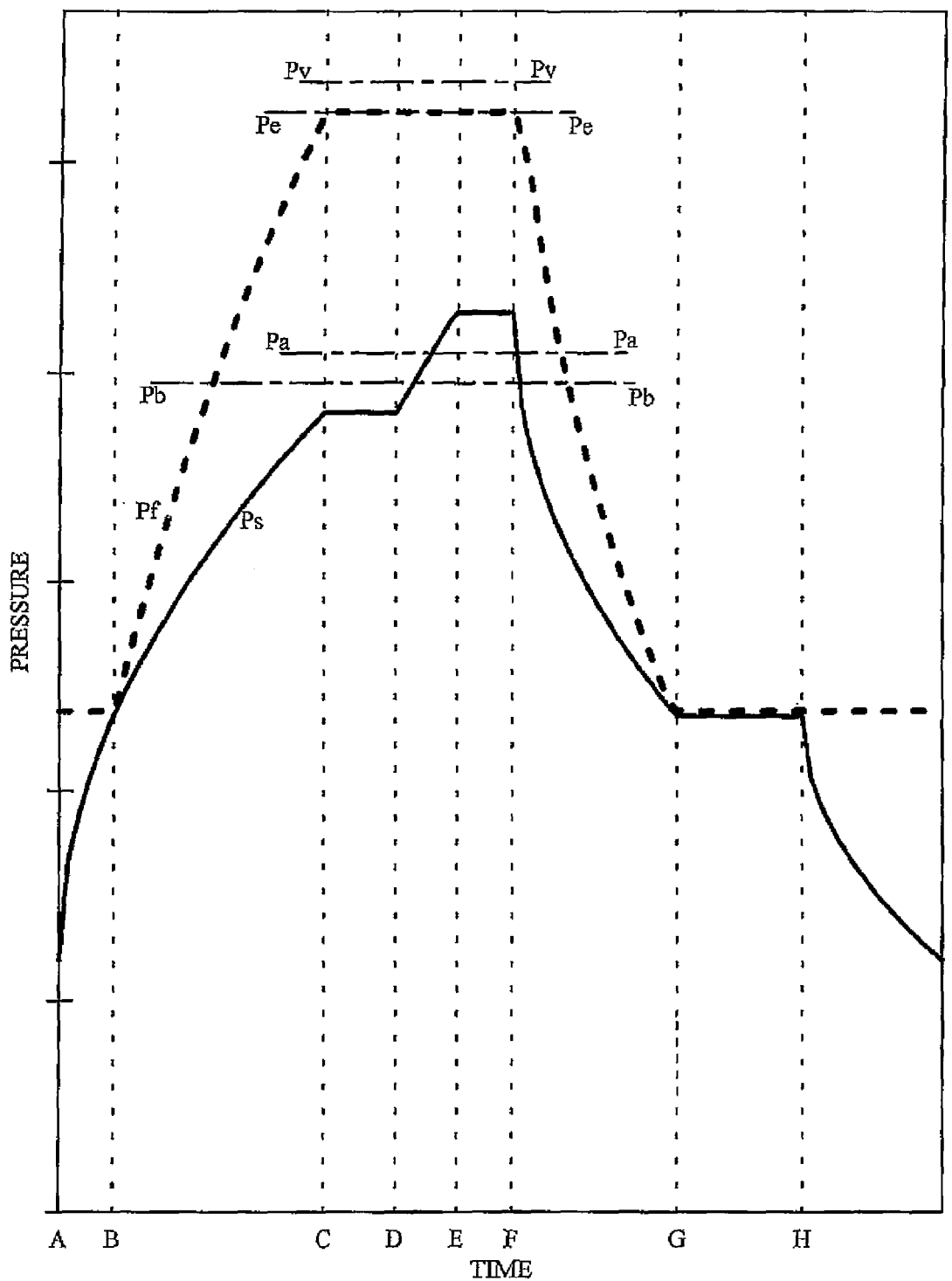
FIG. 2 is a graph showing variation of pressure with time over the operating cycle of the automatic lubrication system shown in FIG. 1.

In operation, as the supply pressure (Ps) from the pump rises as can be seen in FIG. 2, grease is forced into the large end of the injector and passes through to the annular end through the check valve 10. When the pressure reaches a value such that the force generated by the pressure acting on A3 (being equal to A1−A2) exceeds the restraining force (F) of the spring 9 the piston will commence to move to the right. This action will intensify the feed pressure (Pf) acting on the annulus to maintain a force balance as expressed by the equation:—

$$Ps*A1 = Pf*A2 + F$$

While the supply pressure is maintained, the piston continues to move to the right until reaching the end of its stroke, thus injecting grease into the feed line.

As the supply pressure falls at the end of the pump cycle, the combination of the spring force and pressure trapped in the feed line 14 moves the piston back to the left. When the feed pressure falls to the prevailing supply pressure, the check valve 10 opens to admit grease into the annulus area 6A so that the piston can continue to move back under the influence of the spring 9. The pressure created by the spring, the reset pressure (Pr), is defined by the spring force and the area of the small diameter:—

$$Pr = F/A3$$

Current injector designs do not provide intensification, which means that their reset pressure is defined by the spring force and the major sealing diameter of the piston.

The intensifying injector thus provides a higher feed pressure and a higher reset pressure than current designs.

An outlet check valve 11 is provided, mounted on or close to the injector and acts to prevent grease already delivered to the feed line 14 from returning, so that grease from the feed line cannot flow back under the influence of trapped pressure and elasticity of the pipe-work and of the grease in the feed line, and thus reducing the charge of new grease as the injector resets. It is preferable that this outlet check valve 11 be situated close to the injection chamber to minimise any loss of effective injection volume.

A delivery pressurising valve 12 is provided to ensure a minimum upstream pressure in the event of a loss of feed line pressure, so that other injectors connected to the grease pump 1 can continue to function. It is the setting (Pb) of this valve that is adjusted to trigger the pressure sensor in the event of a malfunction.

The delivery pressurising valve 12 is shown schematically as a sequence valve, so that the upstream pressure is not influenced by downstream pressure, with the energising spring shown vented to atmosphere. It will be shown later that other similar constructions of valve can provide similar functionality.

A blocked-line vent valve 13 is provided, normally closed unless a pressure surge is present due to a blockage in the feed line 14. The valve is adjusted to a pressure (Pv) just less than supply pressure multiplied by the intensification ratio. Once the blocked line vent valve 13 opens, it stays open to a very low pressure, simulating the effect of a ruptured line, so that the pressure sensor 2 is triggered. This valve is preferably incorporated within the injector or mounted adjacently with its discharge visible for inspection. Visible discharge indicates that the feed line is blocked, rather than ruptured.

Connecting line 14 indicates that there can be a significant length of feed line 14 between the injector, with its associated valves, and the end-of-line valve 15 and the bearing 16.

The end-of-line valve is by preference mounted directly onto the bearing housing, or at least as close as practicable, to minimise the chance of feed line damage between the valve and bearing. The end-of-line valve 15 is shown schematically as a sequence valve, so that the pressure setting is independent of downstream pressure. The bearing, which also represents other possible lubrication targets, will normally display some pressure rise characteristic as the grease is forced into it.

FIG. 2 shows a simplified graph of an injection cycle with pressure against time. The real-life values will vary depending on the details of component and system design, the length of connecting lines, temperature, type of grease and other factors, so that it requires the judgement of the system designer to specify appropriate design parameters.

The lower full-line graph is the variation of supply pressure (Ps) from the grease pump 1 as seen at the inlet to the injector 4. The upper dashed line is the feed pressure (Pf) as seen at the outlet of the injector 4. Pressure Pa is the setting of the pressure sensor 2, Pb that of the delivery pressurising valve 12, Pe that of the end-ofline valve 15, and Pv that of the blocked-line vent valve 13. The maximum feed pressure is set by the maximum supply pressure multiplied by the intensification ratio, and must be higher than the setting of the blocked-line vent valve.

At time A the grease pump turns on and starts to supply grease to the injectors, so Ps rises. Pf is constant at the reset pressure (Pr) as this is the minimum pressure during a normal series of cycles. At time B, Ps and Pf become equal and intensification commences, continuing through to time C. There is no flow into the feed line until Pf reaches it set pressure at Pb, when there may be some movement of the injector to pressurise the grease in the feed line.

At time C, Pf reaches the maximum pressure as set by the end-of-line valve (Pe) and injection commences, completing at time D. Over the time from B to D, the relationship of the feed pressure to the supply pressure follows the equation below:—

$$Pf=Ps*R-Pr*(R-1)$$

At time D, injection is complete and the feed pressure remains constant with no flow to the bearing 16 due to the holding action of the end-of-line valve. The grease pump 1 is still pumping so the supply pressure keeps rising until time E where the maximum pump pressure is reached. On the way, the supply pressure passes through Pa, activating the pressure sensor. The pump pressure is then held on dwell from time E. At time F the pump is switched off and the supply line vented to the pump system reservoir, so that the pressure starts to fall. Also at time F, the monitoring system checks to see that the pressure sensor has been activated, indicating the system is functioning correctly.

Between F and G, the two pressures fall together, again following the equation above, until the reset pressure is reached at G. The injector then resets, substantially at the reset pressure as the injector spring 9 provides the pressure until the injector is at its fully reset position, at time H. The supply pressure then continues to fall, while the feed pressure stays constant at the reset pressure because it is in a fully sealed condition. Once the injector is reset, the injector 4 can be operated once more. The supply pressure only needs to fall below the reset pressure.

The sequence above describes the performance when there is no malfunction. If the feed line 14 is ruptured, the grease will leak out and there will be no pressure downstream of the delivery pressurising valve 12. Pf will then be limited to the setting of this valve, Pb. The injector 4 will operate, but the supply pressure will then flow through the check valve 10 and the delivery pressurising valve 12 so that the supply pressure will be limited to Pb, and the pressure sensor will not activate, so that the monitoring system can report a malfunction.

A supply pressure of Pb is sufficient to operate all the other injectors, so correct lubrication of all other bearings will continue until the operator is in a position to investigate the cause of the alarm.

Because the injector with the ruptured feed line presents the least resistance, it is to be expected that this one will operate well before the others, between times B and C, giving a good guide as to the location of the problem.

With a blocked or crushed feed line 14, it is to be expected that all the other injectors will operate first, as they have the least resistance. The injector associated with the blocked feed line will then not be fully extended at the time the supply pressure rises at time D, so that a higher than normal pressure will be generated in the injector delivery, rising momentarily above Pv. This will trigger the vent valve 13 to its low pressure state, so that the feed pressure will rapidly fall to Pb, thus failing to activate the pressure sensor in time for F, so that the monitoring system will detect the fault.

Subsequent inspection of the system will show the injector of the faulty circuit operating after the others, and grease will be discharged from the vent valve outlet at 13B.

Figures 3A, 3B, 3C:
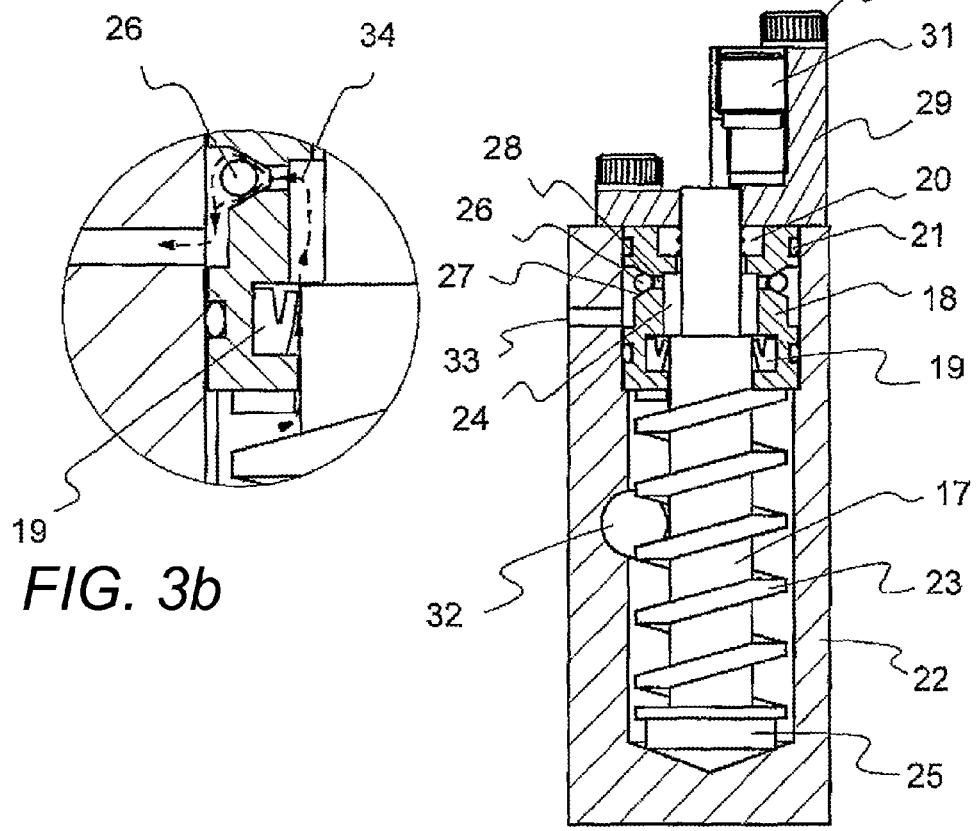
FIG. 3 is a cross-sectional elevation with an enlarged portion shown in the circular insert of the intensifying injector 4 shown in FIG. 1.

FIG. 3 shows a preferred embodiment of the intensifying injector shown diagrammatically at 4 in FIG. 1. Plunger 17 slides within and through sleeve 18 incorporating seals 19 and 20 acting on the piston in slide-able manner, and further seals 21 that provide static sealing between the sleeve and body 22.

Referring to the previous areas, A1 is defined by the sealing diameter of seal 19, A3 by the sealing diameter of seal 20, and A2 as the difference between the two, being the annular area that engages the injection chamber 24. As before the intensification ratio is defined by the ratio of A1 to A2.

The piston construction is different from that diagrammatically illustrated in FIG. 1 in that the spring 23 is mounted outside of the injection chamber. This is functionally equivalent and provides more space for a real spring so that a larger force can be provided to give increased reset pressures. This requires an abutment 25 on the end of the piston to react against the spring. The spring is shown as a heavy duty die spring wound with rectangular section spring wire, but other spring constructions such as round wire, wave or disc springs can be used.

Elastomeric toroidal ring 26 is installed in a wedge-shaped circumferential groove 27, the ring being urged to the bottom of the groove by its elasticity. One or more ports 28 connect the injection chamber to the base of the groove. This construction provides the functionality of the outlet check valve 11 in FIG. 1.

The sleeve is retained in the body by cap 29, attached with screws 30. The sleeve incorporates an adjustment screw 31 that allows the stroke of the piston to be adjusted so that the injected quantity of grease can be set to suit the particular bearing that it is lubricating.

The cap is partly cut away so that the operation of the piston can be viewed by the operator or maintenance mechanic to check that it is functioning correctly. Optionally this cut-away section can be shrouded with a clear plastic cover to provide protection from an adverse environment while still permitting visual inspection.

The function of the injector is as previously described, so that grease under pressure enters the supply port 32. Initially this pressure is transmitted to the feed port 33 by lifting the lip of seal 19 and pushing the ring 26 away from its wedge-shaped groove, as is illustrated by the broken line flow path in the enlarged view. These provide the functionality of the bypass valve 10 and outlet check valve 11 in FIG. 1, also both being desirably mounted close to the injection chamber, minimising the effects of unswept volume. The flow of grease is shown by dashed line 34. The flow to the feed port is very minimal during this part of the cycle, with the connection of pressure to the injection chamber being the functional requirement.

When the supply pressure reaches the setting as set by the force of the spring and the pressure acting on the area A3, the piston starts to move upwards, increasing the feed pressure until it reaches the setting of the end-of-line valve 15 (FIG. 1), the piston then completing its stroke and discharging the prescribed shot of grease to the bearing 16.

At the end of the injection cycle the pressure falls as the pumping system vents down the pressure. When the pressure falls below the setting of the spring, the piston moves downwards with grease filling the injection chamber through seal 19 acting as a check valve as previously described. Pressure in the feed line is maintained substantially at the setting of the end-of-line valve, trapped by the closure of the outlet check valve, as implemented by toroidal ring 26. The injector is now ready for the next cycle.

Figure 4:
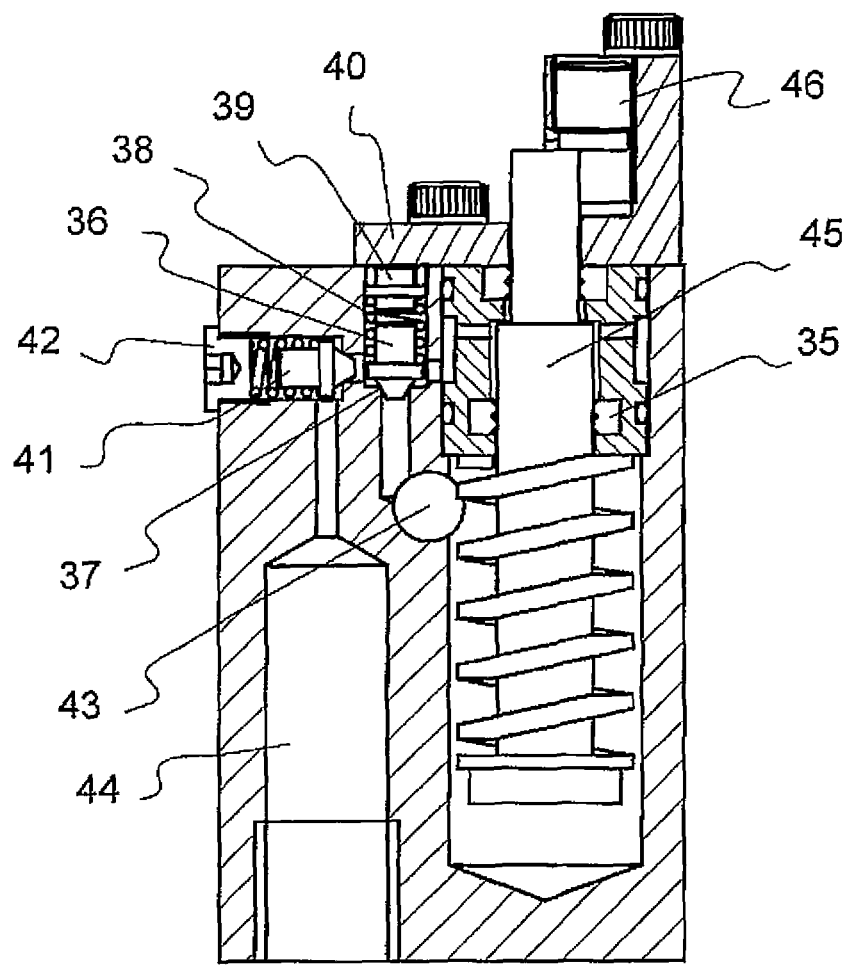
FIG. 4 is an alternative embodiment of the intensifying injector 4 shown in FIG. 1.

FIG. 4 shows an alternative version of the injector where the function of both the bypass and outlet check valves is provided by a conventional construction rather than using the lip of the seal in the first case and an elastomeric ring in the second. The seal 35 on the A1 diameter is not required to be of a lipped construction, but may be so at the discretion of the designer.

The bypass valve poppet 36 is held in sealing contact with seat 37 under the action of light spring 38. This check valve assembly is located and sealed by sealing spool 39 and associated elastomeric seals, and shown as retained by an extension of the cap 40. Similarly, the outlet check valve poppet 41 is urged against its seat by a light spring, and in this case is retained by sealed plug 42.

If the pressure in the supply port 43 tries to exceed the pressure in the feed port 44, both check valve poppets will lift off their seats so that the pressures substantially equalise. During the injection part of the cycle, when the pressure in the supply port is less than that in the feed port, the bypass valve will remain closed and the outlet check valve will lift to admit grease to the feed port.

It will be clear to those skilled in the art that other known types of check valve, such as disc, or ball and spring, can be used to provide the required functionality.

To provide further clarification of the operation of the injector, FIG. 4 shows the piston in the extended position, as it would be at the end of injection. The piston 45 has moved upwards, compressing the spring, until it is prevented from further movement by contact with the adjustment screw 46.

Figure 5:
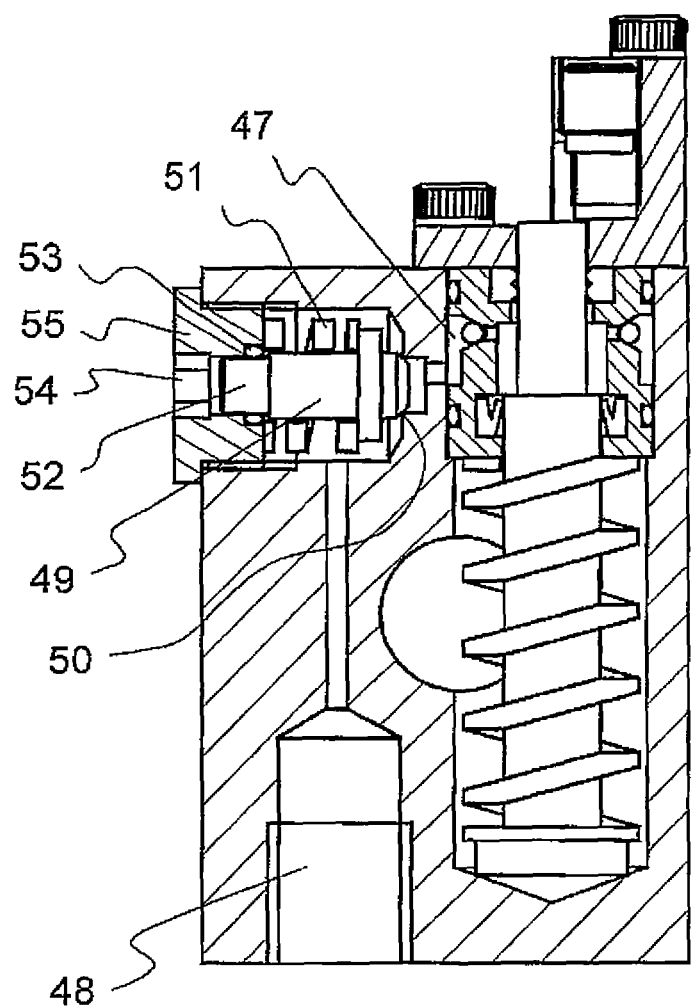
FIG. 5 is a cross-sectional elevation of the delivery pressurising valve shown at 12 in FIG. 1.

FIG. 5 shows a preferred embodiment of the delivery pressurising valve shown diagrammatically at 12 in FIG. 1. As previously described this valve acts to maintain pressure within the rest of the system in the event of a feed line rupture. The setting of this valve provides pressure Pb in FIG. 2.

This embodiment is shown as an addition to the injector described with FIG. 3. The connection between the injector feed gallery 47 and the feed line 48 to the bearing is interrupted by the delivery pressurising valve consisting of a poppet 49 urged against a sealing seat 50 by spring 51. The poppet has a sealed diameter 52 slide-ably in contact with seal 53. The diameter of the sealed diameter is substantially equal to the diameter of the sealing seat, with the end of the poppet open to atmosphere through hole 54 in retaining plug 55, so that the pressure setting of the valve is substantially unaffected by pressure in the feed line, thus performing the function of a sequence valve.

In normal operation this valve will stay closed until the pressure reaches its setting, Pb, and then will stay open whenever the pressure is above Pb, as with normal injection, without imposing any pressure drop in the injector delivery. If the feed line ruptures, the valve will discharge at Pb.

Figures 6A, 6B:
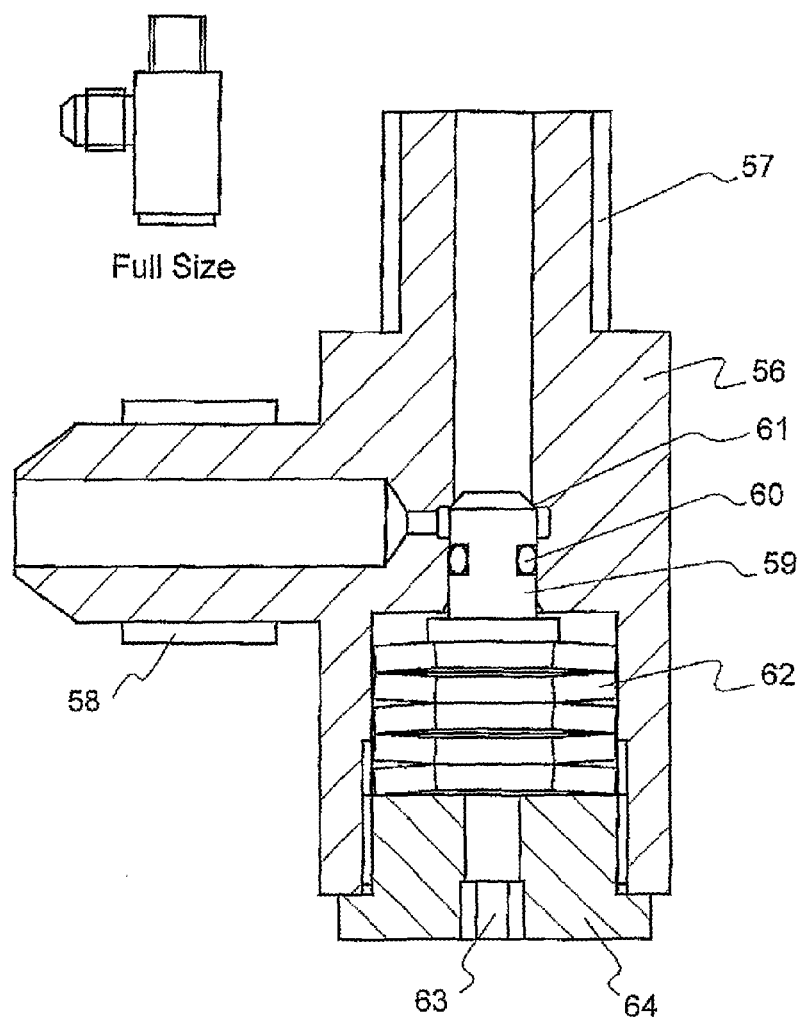
FIG. 6 is an alternative embodiment of the delivery pressurising valve shown at 12 in FIG. 1.

FIG. 6 shows another embodiment of the delivery pressurising valve 12 configured to be screwed into the injector housing, rather than built in as the embodiment shown in FIG. 5. A body 56 has a threaded part 57 for connection to the injector housing and another threaded part 58 for connection to the feed line going to the bearing.

A poppet 59, with seal 60, slides within the body and is urged against sealing seat 61 by spring 62. The diameter of the seat is by necessity slightly smaller than the diameter of the sealed diameter, so the valve is not strictly a sequence valve and is slightly effected by downstream pressure. Within reason this is acceptable because the downstream pressure is essentially constant at Pe under normal operation, thus simply requiring some adjustment of the spring force.

In this case the spring is shown as a stack of disc springs, but other types can be used. The spring chamber is open to atmosphere through hole 63 in retaining plug 64.

These embodiments show different constructions that meet the functional requirement of the invention; there being many other valve constructions of similar type, well known to those skilled in the art, that could be used.

As described previously, the function of the end-of-line valve 5 is to ensure that the feed line 14 is always under pressure in normal operation, and only falls to a lower value if there is a rupture or blockage. The setting of this valve is pressure Pe, as shown in FIG. 2.

Figures 7A, 7B:
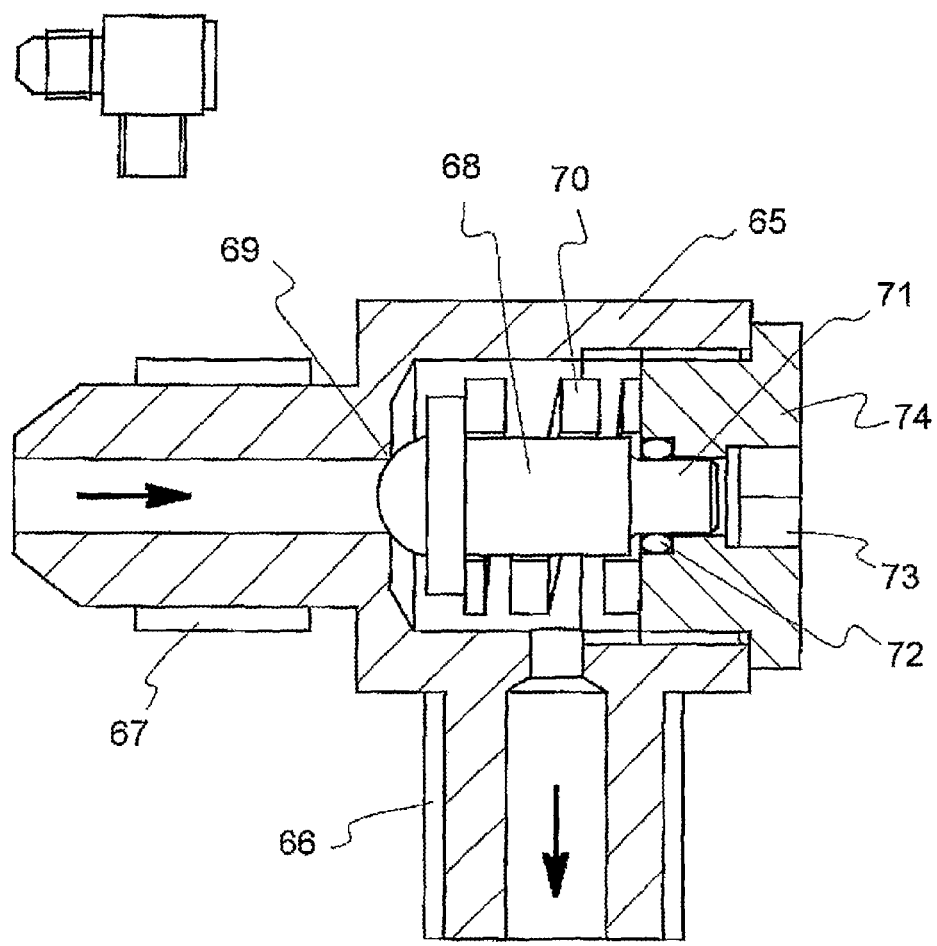
FIG. 7 is a cross-sectional view of an embodiment of the end of line valve shown at 15 in FIG. 1.

FIG. 7 shows an embodiment of the end-of-line valve. A body 65 has a threaded part 66 for screwing into a bearing housing, not shown, and a second threaded part 67 to which the feed line from the injector is connected. A poppet 68 is urged against sealing seat 69 by spring 70. The opening pressure of the valve is set by the area of the seat and the force of the spring.

The poppet has an extended portion 71 having a diameter substantially the same as the seat, sealed by seal 72, with the small end of the poppet open to atmospheric pressure through hole 73 in retaining plug 74. By this means the valve operates as a sequence valve in being substantially unaffected by pressure in the bearing housing. This means that the injection is not affected by any restrictions to flow within the bearing or bearing housing and that the full injection pressure is available to overcome any such restrictions.

A feature of this preferred embodiment is that the body is purposely made weaker in the vicinity of the second threaded part than in that of the first threaded part, so that a feed line that gets snagged and forcibly ripped off will tend to break the body upstream of the valve thus venting the injection pressure. If the body were to break at the first threaded part, the valve would still be attached to the feed line and the pressure would not be vented, even though the bearing is no longer being lubricated.

The preferred embodiment of the end-of-line valve is to use a sequence valve as described, but given that the restriction in the bearing housing can be minimised by suitable design, the use of a relief valve or partial sequence valve, similar to that described with reference to FIG. 6, could also meet the requirements of the invention.

The embodiment described shows a preferred construction that meets the functional requirement of the invention; there being many other valve constructions of similar type, well known to those skilled in the art, that could be used.

As described previously, the function of the blocked-line vent valve 13 is to open and stay open in the event of an excessive pressure in the feed line as would be generated by injection into a feed line that is blocked, crushed or otherwise impeded, thus converting a high pressure situation to a low pressure that is then sensed in the same way as a ruptured line. The setting of this valve is Pv in FIG. 2.

Figure 8:
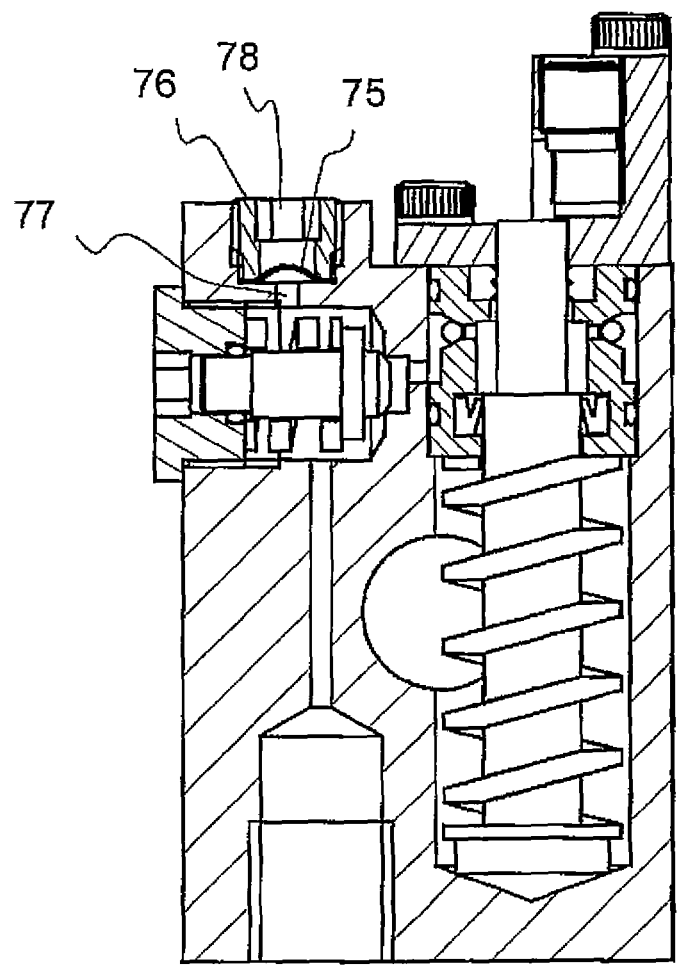
FIG. 8 is an embodiment of the block line vent valve shown at 13 in FIG. 1, incorporated into the housing of the intensifying injector.

FIG. 8 shows a preferred embodiment of the blocked-line vent valve installed in an injector with delivery pressurising valve as described with reference to FIG. 5. A rupture disc 75 is clamped in place in the body by retaining plug 76. The pressure side of the rupture disc is connected to the feed line through drilling 77, and the vent side of the disc is connected to atmosphere through hole 78 in the retaining plug.

The rupture disc is constructed to burst at pressure Pv. Once this has occurred the output from this particular injector is vented, signalling a malfunction. Rectification requires repairing the blocked line and replacing the rupture disc. Other injectors powered by the same grease pump will continue to operate normally because an acceptable operating pressure is maintained by the delivery pressurising valve.

A feature of this embodiment is that the discharge of grease following bursting of the disc is visible in the vicinity of the visual indication of injector operation, to provide for easy troubleshooting.

Figures 9A, 9B:
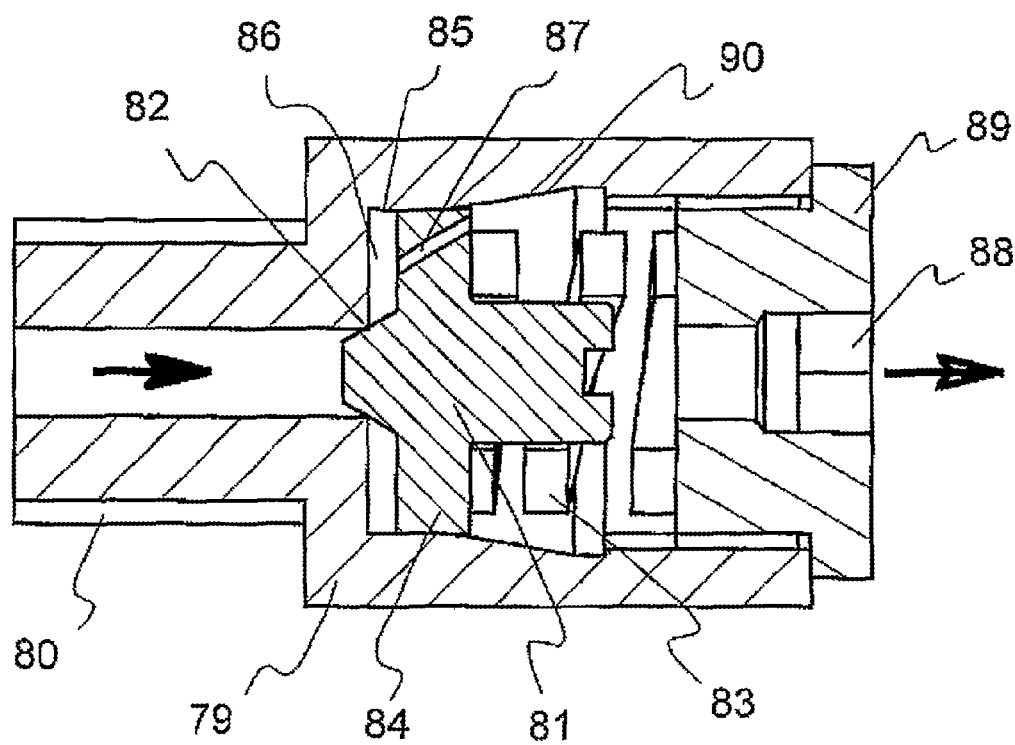
FIG. 9 is a cross-sectional view of an alternative embodiment of the block line vent valve.

FIG. 9 shows another embodiment of the blocked-line vent valve 13 configured to be teed into the feed line wherever convenient, but preferably close to the injector.

A body 79 has a threaded portion 80 for connecting to the feed line. A poppet 81 slides within the body and is urged against sealing seat 82 by spring 83. The combination of the area of the seat diameter and the spring force define the pressure setting as Pv.

The poppet incorporates a flange 84 that is a close sliding fit in a corresponding bore 85 in the body, so that opening of the poppet and seat due the injection pressure exceeding Pv, will allow grease into chamber 86 so that the pressure setting of the valve is now defined by the area of the much larger diameter of the poppet flange and the same spring force. By design, this lower pressure setting is sufficiently low to signal a malfunction.

An orifice 87 is shown through the flange so that the valve will remain open for as long as the grease flow exceeds the flow that can pass through the orifice at the lower pressure. Once the flow reduces sufficiently the valve can re-seat and it will then need a further high pressure occurrence to cause it to open again. The valve discharges to atmosphere through hole 88 in retaining plug 89, and is then visible to assist in identifying the blocked injector feed line.

The volume of grease that needs to be discharged from the supply and feed lines can be significant in larger systems with long connection lines, so it is possible that the size of the orifice will not permit the volume to be discharged in time to signal a malfunction. If the orifice is overwhelmed in this manner, the poppet will travel further so that its flange clears the bore 85 and opens to the conical undercut 90, thus providing for a greater volume of discharge.

The restricted bypass of the flange is shown as an angled orifice for clarity of description, whereas a preferred embodiment would be to achieve the same flow capability by a defined clearance between the flange and corresponding bore. Another option would be to use one or more notches on the outside diameter of the flange.

The same functionality described in these embodiments can be provided by other designs within the knowledge of those skilled in the art.

Although the preferred embodiment of the invention is shown diagrammatically in FIG. 1, there are commercial situations where it is appropriate to provide a simpler and lower cost solution, even with some compromise on technical performance, such as:

In many lubrication systems the occurrence of a feed line rupture is a rare event, and usually the occurrence of a blockage even more unlikely.

There are also situations where shutting down and repairing a machine immediately a malfunction alarm is triggered is not very inconvenient or costly.

There are circumstances where continued running without automatic lubrication until the end of the work period is a sensible decision, providing that the system has warned the operator that maintenance is then required.

Figure 10:
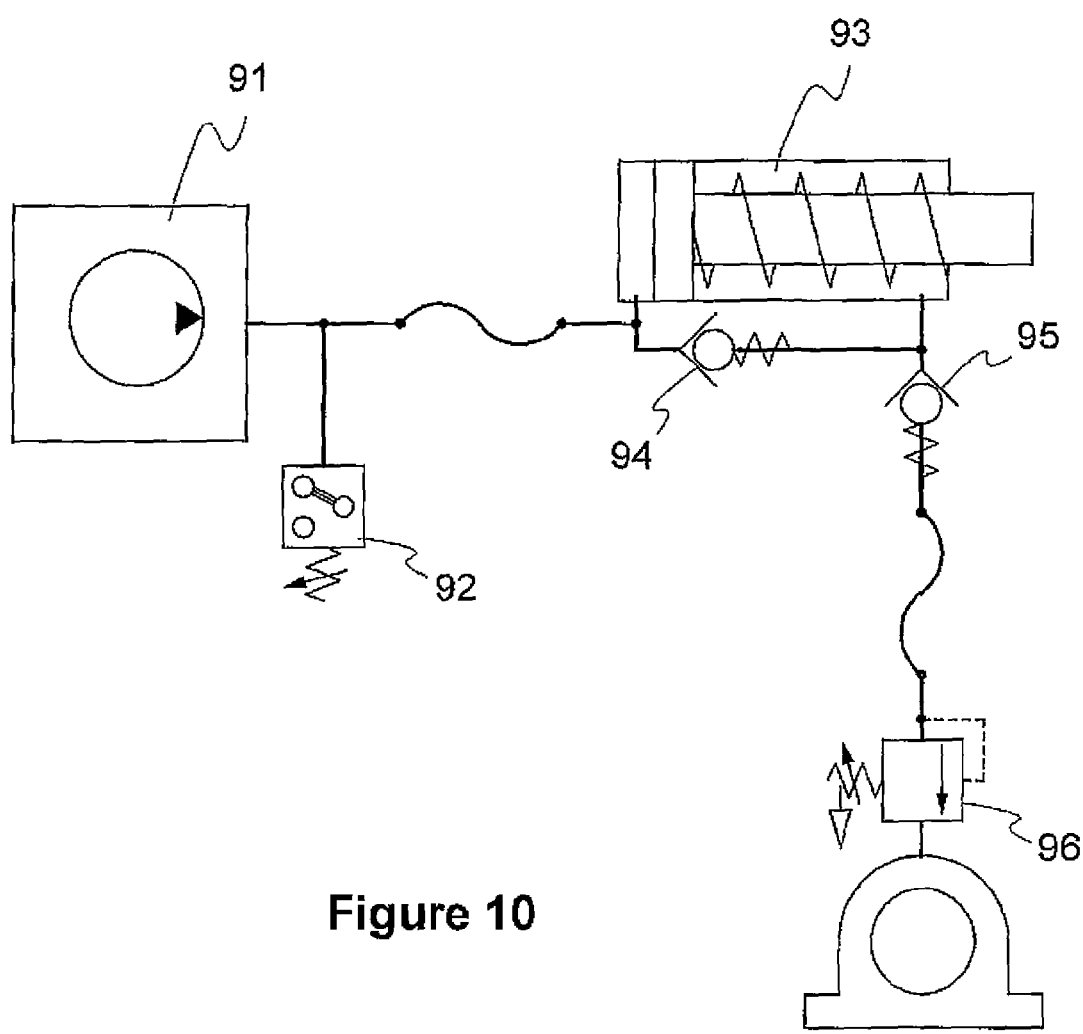
FIG. 10 is a diagrammatic view of a simplified embodiment of the invention.

FIG. 10 shows a schematic of such a minimalist system, basically a reduced version of that described with FIG. 1. The pump 91 is functionally the same, but would probably be a low cost version. Pressure sensor 92 and intensifying injector 93 with its associated check valves 94 and 95 are the same as previously described, as is the end-of-line valve 96.

In this embodiment a feed line rupture will provide the malfunction alarm but also make the entire lubrication system ineffective, as it does not provide for the other injectors to continue functioning.

In this embodiment, the crucial components of the invention are the intensifying injector 93 and the end-of-line valve 96.

This simplified implementation can be enhanced, at some increase in cost, by the addition of a blocked-line vent valve 13, as previously described with reference to FIG. 1. Similarly, a sequence valve, set to Pb, could be placed in the supply pressure line to a bank of injectors so that a pressure loss in an injector feed line would only affect the other injectors in the same bank, with other banks of injectors using the same pump being able to continue to operate.

Figure 11:
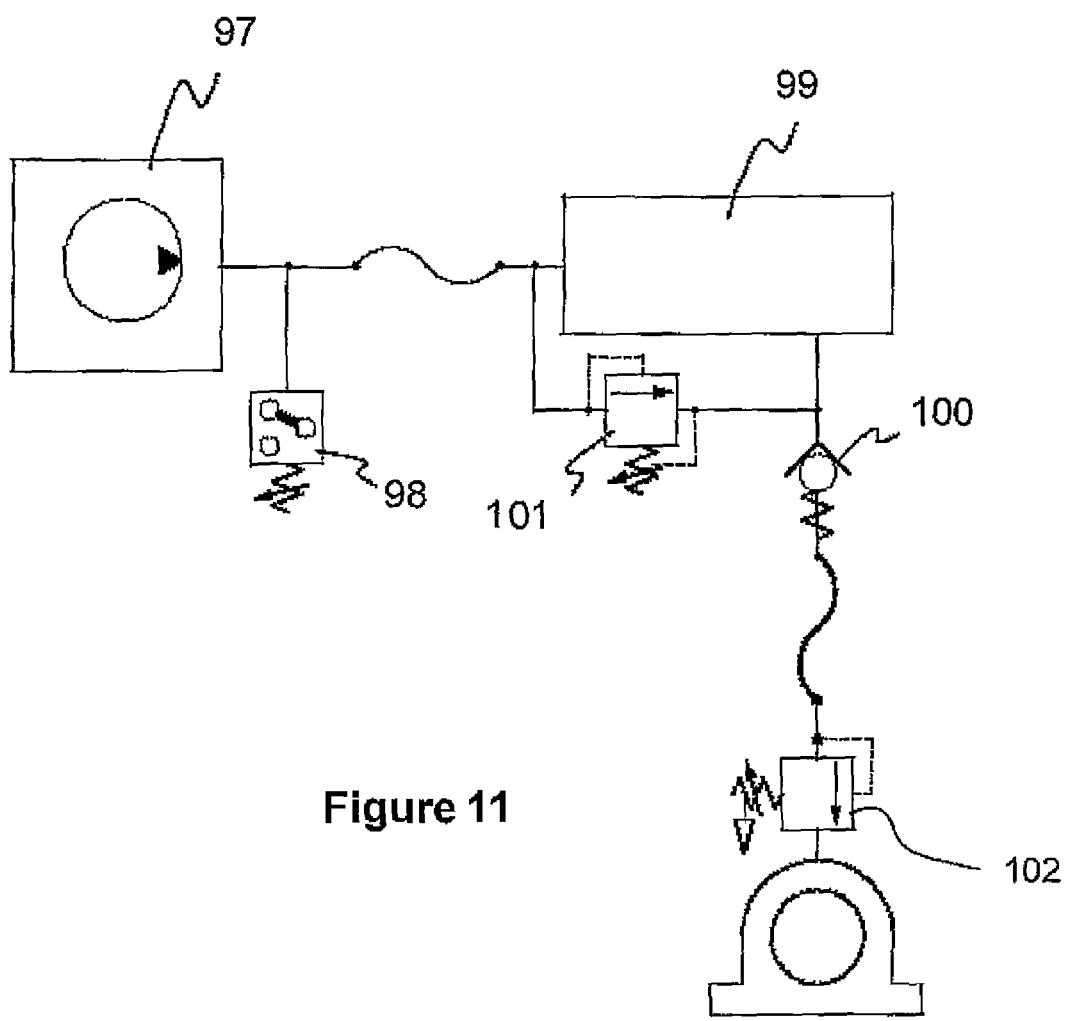
FIG. 11 is a diagrammatic view of an alternative simplified embodiment of the invention.

The end-of-line valve can be usefully applied to other injector systems, as illustrated in FIG. 11. The grease pump 97 and pressure sensor 98 are the same as previously described. The injector 99 can be many of the known types of injectors, such as in-line, dual line and progressive.

Outlet check valve 100 prevents grease under pressure in the feed line from flowing back into the injector, which would otherwise reduce the injector charge.

A relief valve 101 is set to a pressure lower than the setting of the pressure sensor, so that the sensor will not activate if the feed line is ruptured. The setting of the end-of-line valve 102 must be high enough that the sum of the settings of the relief and end-of-line valves exceeds the maximum pressure from the pump.

This system can be enhanced by the addition of a blocked-line vent valve, or by a pressurising sequence valve at the inlet to the injector, or bank of injectors, to allow other injectors, or banks of injectors, to continue operation in the manner previously described.

A simplified and fully adjustable form of injector has also been devised for use with the invention. This injector has a cartridge construction and will now be described with reference to FIGS. 12 to 15.

Figure 12:
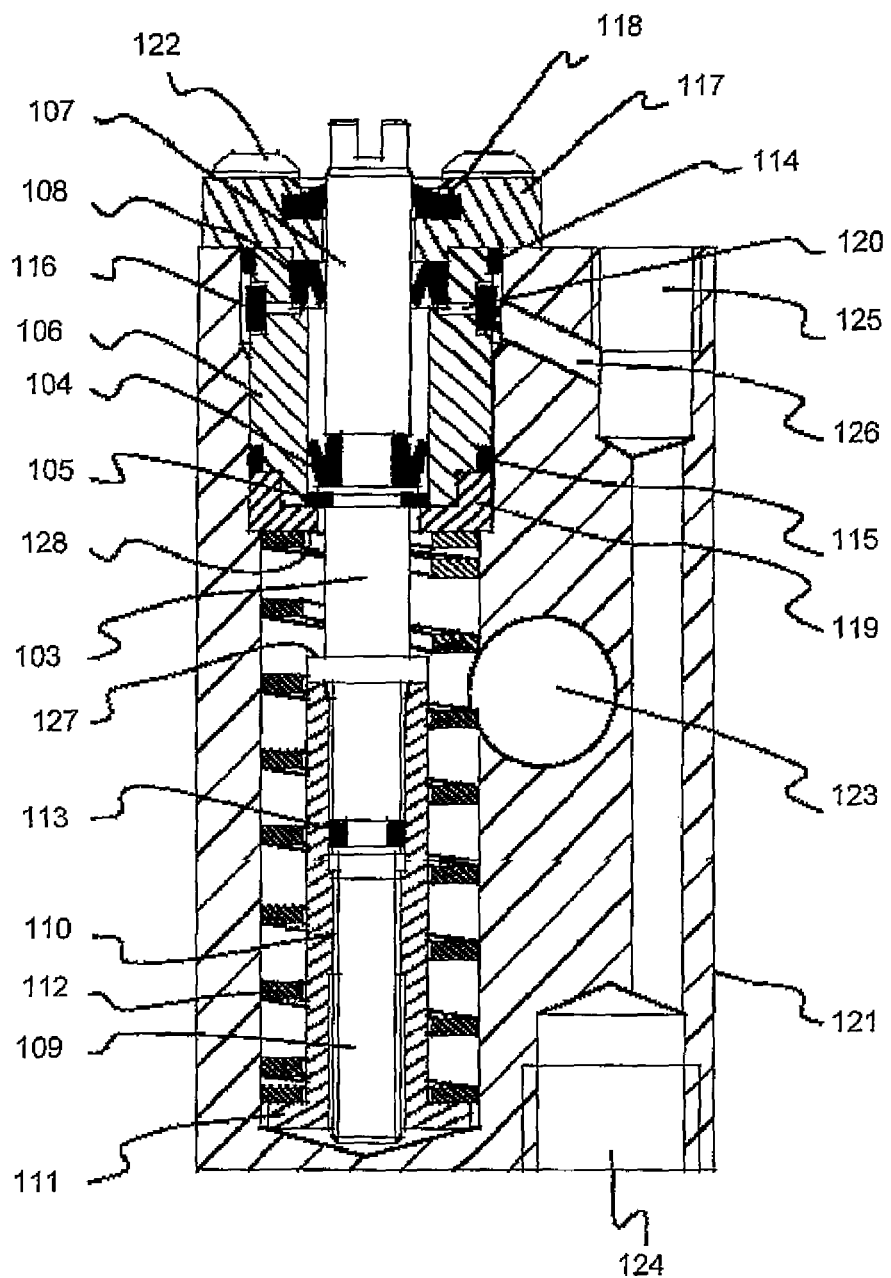
FIG. 12 is a cross-sectional view of an intensifying injector for use in the invention, designed with a simplified cartridge construction.

FIG. 12 shows a simplified embodiment of the intensifying injector shown at 4 in FIG. 1. A piston assembly comprises of a piston 103, a piston seal 104 and a retaining ring 105. The piston assembly slides axially within cylinder 106 with the piston seal effectively forming a larger diameter of the piston assembly. The piston has a piston rod 107 at its outer end that slides in sealing contact with rod seal 108, effectively forming a smaller diameter of the piston assembly.

The larger diameter defines area A1, the smaller diameter defines area A3, and the annular area between the diameters defines area A2.

The outer end of the piston rod is formed into a slot, or other means to facilitate rotation of the piston, for setting purposes, in a manner to be described later. The other end of the piston consists of a male threaded portion, 109, engaging with a female thread 110 in spring sleeve 111, acting to retain spring 112. A friction ring 113, of elastomeric material, is preferably arranged to provide some friction between the piston and spring sleeve to assist in maintaining a setting, again to be described below.

A cylinder assembly comprises the cylinder, seals 114 and 115, elastomeric ring 116, end cap 117 with wiper seal 118, and stop ring 119. The bore of the cylinder is connected by a number of drillings 120 to the inside diameter of the elastomeric ring, providing a construction that functions as a check valve.

The wiper seal acts to prevent contaminants from the machine environment entering the injector. Either, but not both, of the end cap or the stop ring could be manufactured as part of the cylinder, but the preferred embodiment provides three separate components for ease of assembly and to reduce the cost of machining the cylinder bore to a good surface finish.

The assemblage of the piston assembly and cylinder assembly together with the spring and spring sleeve form a cartridge that can be installed or removed from the body 121 as required. The retaining ring holds the force of the spring when the cartridge is out of the body, and serves no other function once the cartridge is installed. This cartridge is retained in the body by screws 122 fastening the end cap to the body.

The body has a cavity for the cartridge, and includes inlet port 123, outlet port 124 and auxiliary port 125. The inlet port breaks into the cavity in the vicinity of the spring. The outlet port is connected to the outside of the cylinder assembly by drilling 126. As installed in a lubrication system, the inlet port is connected to the lubrication pump supply line, the outlet port to the feed line to the bearing, and the auxiliary port can optionally be used for other purposes such as mounting of a blocked-line vent valve as described previously.

In use, the lubrication pump periodically pressurises the inlet port. Initially this can cause flow past the lips of the piston seal, lifting the elastomeric ring from its seat to allow flow to the outlet. As the inlet and outlet pressures equalise there is an outward force on the piston due to the inlet pressure acting on area A1 whereas the outlet pressure acts only on the smaller area A2. When this force exceeds the force of the spring, the piston will move outwards, providing an intensified outlet pressure.

Figure 13:
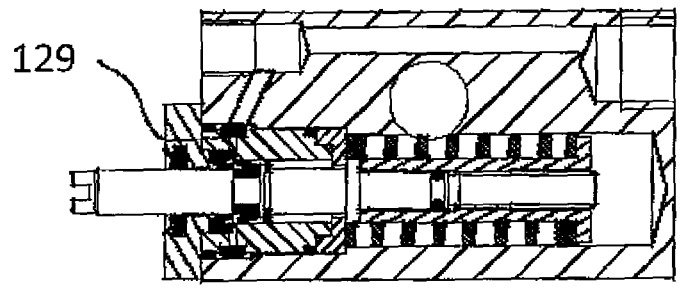
FIG. 13 is a cross-section of the injector shown in FIG. 12 showing the piston of the injector in a fully extended position.

The piston will move outwards until the striker face 127 meets with the inner face 128 of the stop ring, as shown in FIG. 13. The piston is now in its fully extended position, the spring is fully compressed and the injection is complete. The unswept volume 129 in the cylinder is, according to the invention, minimal to provide improved reliability of operation.

The lubrication pump subsequently cycles off, venting the supply line to the reservoir, causing the inlet pressure to fall. The pressure in the feed line is maintained by the check valve action of the elastomeric ring. When the inlet pressure falls to a value that the force from its action on area A3 falls below the spring force, the piston will retract towards the position illustrated in FIG. 12, allowing a new charge to enter the cylinder past the lips of the piston seal. The injector is now ready for the next cycle.

Figure 14:
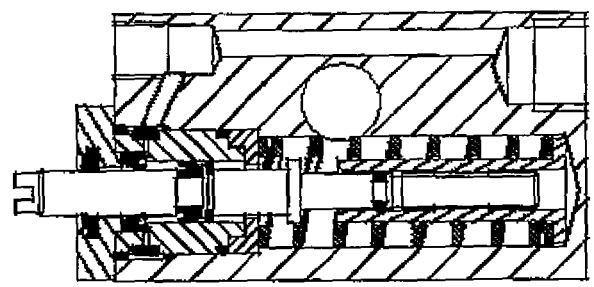
FIG. 14 is a similar view to FIG. 13 showing the piston at a reduced displacement position.

The volume of lubricant delivered with each injection is set by the stroke of the piston and the area A2. This amount can be varied by adjusting the initial position of the piston. FIG. 14 shows the piston at a reduced displacement position. Setting is achieved by rotating the piston with a screwdriver, with the injector inactive, to partly extend the piston. The spring sleeve is clamped by the force of the spring urging against the end of the cavity in the body. The friction ring acts to prevent the piston from inadvertently rotating during operation. The setting is readily visible and can be measured and recorded as required.

Figure 15:
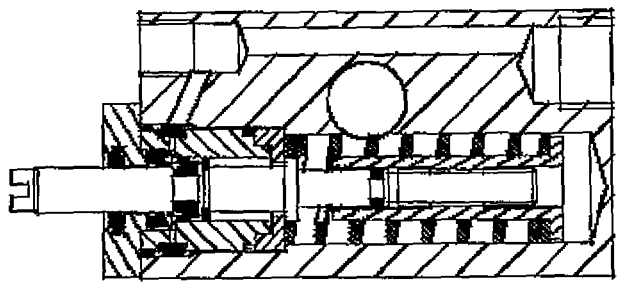
FIG. 15 is a similar view to FIG. 13 showing the adjusted injector at the end of the injection stroke.

FIG. 15 shows the adjusted injector at the end of the injection, with the extension of the piston being the same for all settings, adjustment being achieved, as described above, by changing the initial position of the piston.

The invention claimed is:

1. A system for automatically delivering lubricant from a reservoir to at least one bearing, the system comprising:
  a lubricant pump periodically drawing from the reservoir and delivering lubricant into a supply conduit connected to an inlet of at least one sliding piston injector,
  wherein the sliding piston injector is adapted to be driven by the lubricant delivered under a supply pressure from the pump and to inject a quantity of the lubricant through an outlet of the sliding piston injector connected to a feed conduit feeding to the bearing,
  a check valve at the outlet of the sliding piston injector acting to allow discharge of the lubricant from the injector into the feed conduit, but preventing the lubricant from flowing from the feed conduit back into the injector when the pump is inactive,
  a first pressurising valve located in the feed conduit, having a preset pressure setting and arranged to maintain an injection pressure in the feed conduit in normal operation of the system; and
  a bypass valve, with a preset pressure setting lower than a maximum supply pressure from the pump, connecting the supply conduit to the feed conduit, bypassing the injector, with the additive preset pressure settings of the bypass valve and the first pressurising valve exceeding the maximum supply conduit pressure from the pump, preventing flow through the bypass valve in normal operation of the system, allowing the supply line pressure to cyclically reach the maximum supply pressure from the pump, wherein, in the case of a feed conduit rupture between the injector and the first pressurising valve, the first pressurising valve ceases to be effective, and the pump delivery bypasses the injector through the bypass valve leading to a reduction in the supply pressure.

2. A system as claimed in claim 1, further comprising pressure sensor mean reactive to pressure in the supply conduit and being configured to evaluate the pressure achieved during the operation of the system, thereby enabling detection of a rupture in the feed conduit.

3. A system as claimed in claim 2, wherein the pressure sensor is a pressure switch activated by a lower than normal pressure in the supply line.

4. A system as claimed in claim 1, wherein a second pressurising valve is provided, located at an injector end of the feed conduit providing for sufficient pressure in the supply line following a rupture in the feed conduit to operate other injectors powered by the same lubricant pump.

5. A system as claimed in claim 4, wherein one or both of the pressurising valves are sequence valves.

6. A system as claimed in claim 1, wherein either or both of the first pressurising valve and the bypass valve are sequence valves, with their settings being independent of downstream pressure.

7. A system as claimed in claim 1, wherein the injector is arranged to produce a pressure at the outlet higher than the pressure at the inlet.

8. A system as claimed in claim 7, wherein the bypass valve is a check valve, acting to bypass the injector in the event of a rupture of the feed line, and acting to prevent reverse flow from the feed line to the supply line in normal operation.

9. A system as claimed in claim 1, further comprising venting means in the feed conduit arranged to vent the feed conduit pressure in the event of momentary excessive pressure, causing a reduction in supply pressure.

10. A system as claimed in claim 1, wherein the first pressurising valve is located at a bearing end of the feed conduit.

* * * * *